(12) United States Patent
Suh et al.

(10) Patent No.: US 11,100,249 B2
(45) Date of Patent: Aug. 24, 2021

(54) APPARATUS AND METHOD FOR ENHANCING PERSONAL INFORMATION DATA SECURITY

(71) Applicant: Samsung Electronics Co., Ltd., Suwon-si (KR)

(72) Inventors: Kyung-Joo Suh, Seoul (KR); Han-Il Yu, Seongnam-si (KR); Sang-Jin Kim, Suwon-si (KR); Joo-Hyun Park, Seoul (KR); Hye-Jin Lee, Seoul (KR); Hee-Jeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 15/545,285

(22) PCT Filed: Jan. 19, 2016

(86) PCT No.: PCT/KR2016/000550
§ 371 (c)(1),
(2) Date: Jul. 20, 2017

(87) PCT Pub. No.: WO2016/117907
PCT Pub. Date: Jul. 28, 2016

(65) Prior Publication Data
US 2018/0014198 A1 Jan. 11, 2018

(30) Foreign Application Priority Data
Jan. 20, 2015 (KR) .................. 10-2015-0009275

(51) Int. Cl.
*G06F 21/62* (2013.01)
*H04W 12/02* (2009.01)
(Continued)

(52) U.S. Cl.
CPC ........ *G06F 21/6245* (2013.01); *G06F 21/305* (2013.01); *G06F 21/44* (2013.01);
(Continued)

(58) Field of Classification Search
CPC ... H04L 63/105; H04L 63/08; H04L 63/0892; H04L 63/10–107; G06F 21/6218;
(Continued)

(56) References Cited

U.S. PATENT DOCUMENTS 7,261,691 B1 * 8/2007 Asomani ............... A61B 5/1112
128/920
8,538,374 B1 * 9/2013 Haimo .................. G01S 5/0027
455/404.2
(Continued)

FOREIGN PATENT DOCUMENTS

CN 102473283 A 5/2012
CN 103167216 A 6/2013
(Continued)

OTHER PUBLICATIONS

Extended European Search Report for European Application No. 16740380.7, dated Nov. 29, 2017. (7 pages).
(Continued)

*Primary Examiner* — Alexander Lagor
*Assistant Examiner* — D'Arcy Winston Straub

(57) ABSTRACT

The present disclosure relates to a communication technique for converging a 5G communication system for supporting a higher data rate beyond a 4G system with an IoT technology, and a system therefor. The present disclosure provides a method and a device for enhancing data security. The method includes when a request message including information related to a first privacy level is received from a user device, authenticating the user device. The method also includes verifying the information related to the first privacy
(Continued)

level. The method further includes transmitting, to the terminal, an image processed on the basis of the first privacy level among images processed on the basis of a plurality of privacy levels.

16 Claims, 9 Drawing Sheets

(51) Int. Cl.

| | | |
|---|---|---|
| *H04W 12/033* | (2021.01) | |
| *H04W 12/65* | (2021.01) | |
| *G06F 21/30* | (2013.01) | |
| *H04N 1/44* | (2006.01) | |
| *H04W 4/90* | (2018.01) | |
| *G06F 21/44* | (2013.01) | |
| *H04W 12/08* | (2021.01) | |
| *H04W 4/70* | (2018.01) | |
| *H04L 29/06* | (2006.01) | |

(52) U.S. Cl.
CPC ...... *G06F 21/6218* (2013.01); *H04L 63/0892* (2013.01); *H04L 63/105* (2013.01); *H04L 63/107* (2013.01); *H04N 1/444* (2013.01); *H04N 1/448* (2013.01); *H04W 4/70* (2018.02); *H04W 4/90* (2018.02); *H04W 12/02* (2013.01); *H04W 12/033* (2021.01); *H04W 12/08* (2013.01); *H04W 12/65* (2021.01)

(58) Field of Classification Search
CPC .... G06F 21/6245; G06F 21/30; G06F 21/305; G06F 21/62–6245; H04W 12/82; H04W 4/90; H04N 1/444
See application file for complete search history.

(56) References Cited

U.S. PATENT DOCUMENTS

| | | | |
|---|---|---|---|
| 8,970,697 B2 | 3/2015 | Inami et al. | |
| 2003/0023451 A1* | 1/2003 | Willner | ................ H04L 63/105 713/151 |
| 2005/0123172 A1* | 6/2005 | Henson | ............ G08B 13/19686 382/103 |
| 2006/0028488 A1* | 2/2006 | Gabay | ................... H04L 65/607 345/626 |
| 2009/0010570 A1* | 1/2009 | Yamada | ................. H04N 19/61 382/312 |
| 2009/0300698 A1 | 12/2009 | Quigley et al. | |
| 2010/0026817 A1 | 2/2010 | Ryan et al. | |
| 2012/0151601 A1 | 6/2012 | Inami et al. | |
| 2014/0113556 A1* | 4/2014 | Kotecha | ................ H04W 76/14 455/41.2 |
| 2016/0364615 A1* | 12/2016 | Sakoda | ............. H04N 1/00244 |

FOREIGN PATENT DOCUMENTS

| | | |
|---|---|---|
| CN | 103544826 A | 1/2014 |
| CN | 103905796 A | 7/2014 |
| KR | 101065649 B1 | 9/2011 |
| KR | 101210996 B1 | 12/2012 |
| KR | 1020130012286 A | 2/2013 |
| KR | 1020130126800 A | 11/2013 |
| KR | 1020140103532 A | 8/2014 |
| KR | 1020140128838 A | 11/2014 |

OTHER PUBLICATIONS

ISA/KR, "International Search Report," Application No. PCT/KR2016/000550, dated May 20, 2016, 3 pages.
ISA/KR, "Written Opinion of the International Searching Authority," Application No. PCT/KR2016/000550, dated May 20, 2016, 7 pages.
China National Intellectual Property Administration, Search Report in connection with Application No. CN 201680006495.6, dated Nov. 5, 2019, 9 pages.
Office Action dated Jul. 14, 2020 in connection with Chinese Patent Application No. 201680006495.6, 10 pages.
The Rejection Decision dated Oct. 29, 2020 in connection with Chinese Application No. 201680006495.6, 14 pages.
Office Action dated May 25, 2021 in connection with Chinese Patent Application No. 201680006495.6, 14 pages.

\* cited by examiner

APPARATUS AND METHOD FOR ENHANCING PERSONAL INFORMATION DATA SECURITY

CROSS-REFERENCE TO RELATED APPLICATIONS

The present application claims priority under 35 U.S.C. § 365 and is a 371 National Stage of International Application No. PCT/KR2016/000550 filed Jan. 19, 2016, which claims the benefit of Korean Patent Application No. 10-2015-0009275 filed Jan. 20, 2015, the disclosures of which are fully incorporated herein by reference into the present disclosure as if fully set forth herein.

TECHNICAL FIELD

The present disclosure relates to an apparatus and method for enhancing the security of personal information data transmitted/received over a communication network.

BACKGROUND

To satisfy demands for wireless data traffic having increased since the commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MEMO (FD-MIMO), array antenna, analog beamforming, and large-scale antenna technologies have been discussed to alleviate a propagation path loss and to increase a propagation distance in the ultra-high frequency band.

For network improvement of the system, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, the Internet has evolved from the human-oriented connection network in which the humans create and consume information, into the Internet of things (IoT) network in which distributed components such as things (or objects) exchange information with each other, and process the information. Internet of everything (IoE) technology may be an example in which big data processing technology through connection with a cloud server is combined with the IoT technology.

Since the technical elements such as sensing technology, wired/wireless communication & network infrastructure, service interface technology and security technology are required to implement IoT, technologies such as sensor network for connection between things, machine-to-machine (M2M), and machine type communication (MTC) have been studied in recent years.

In the IoT environment, an intelligent Internet technology (IT) service can be provided, that collects and analyzes the data created from connected things to create new value in human life. IoT may be applied to fields such as smart homes, smart buildings, smart cities, smart cars or connected cars, smart grids, healthcares, smart appliances, advanced medical services and the like, through convergence and combination between the existing IT technology and various industries.

Accordingly, various attempts have been made to apply the 5G communication system to the IoT network. For example, the technologies such as sensor network, M2M and MTC may be implemented by the techniques such as beamforming, MIMO and array antenna of the 5G communication technologies. The cloud wireless access network being applied as the above-described big data processing technology may also be an example of the convergence between the 5G technology and the IoT technology.

For IoT devices, wearable devices, electric-health (e-health) devices, smart home devices and the like, to which the 5G technology and the IoT technology are applied, each device may be connected to the Internet to provide more diverse and convenient services to users.

Further, each device may transmit user's personal information, privacy-related information and the like over the communication network. However, since such information may be collected regardless of the user intent, and the collected information may be forged and transmitted again, the security may be a very important issue for the devices that provide services to the users over the communication network.

Therefore, in the next-generation communication system, it is necessary to study a way to solve the security vulnerabilities or the privacy infringements of the devices that provide services to the users over the communication network.

SUMMARY

An embodiment of the present disclosure provides an apparatus and method for enhancing the security of data transmitted/received over a communication network.

Further, an embodiment of the present disclosure provides an apparatus and method for transmitting, to a user device, an image processed based on a privacy level of the user device.

Further, an embodiment of the present disclosure provides an apparatus and method for transmitting a raw image to a user device in an emergency situation.

Further, an embodiment of the present disclosure provides an apparatus and method for detecting modulation of an image processed based on a privacy level of a user device.

In accordance with an embodiment of the present disclosure, a method for enhancing data security includes: if a request message including information related to a first privacy level is received from a user device, authenticating the user device; if the user device is determined as an authenticated device, verifying the information related to the first privacy level; if the verification of the information related to the first privacy level is completed, transmitting, to the user device, an image processed based on the first privacy level among images processed based on a plurality of privacy levels.

In accordance with another embodiment of the present disclosure, an apparatus for enhancing data security includes a processing module configured to, if a request message including information related to a first privacy level is received from a user device, authenticate the user device; and if the user device is determined as an authenticated device, verify the information related to the first privacy level; and a transmission/reception module configured to, if the verification of the information related to the first privacy level is completed, transmit, to the user device, an image processed based on the first privacy level among images processed based on a plurality of privacy levels.

Other aspects, advantages and key features of the present disclosure will become apparent to those skilled in the art from the following detailed description, which, taken in conjunction with the annexed drawings, discloses exemplary embodiments of the present disclosure.

By enhancing the security of data transmitted/received over the communication network, the present disclosure may resolve the security vulnerabilities or the privacy infringements of the devices that provide services to the users over the communication network.

DETAILED DESCRIPTION

Figure 1:
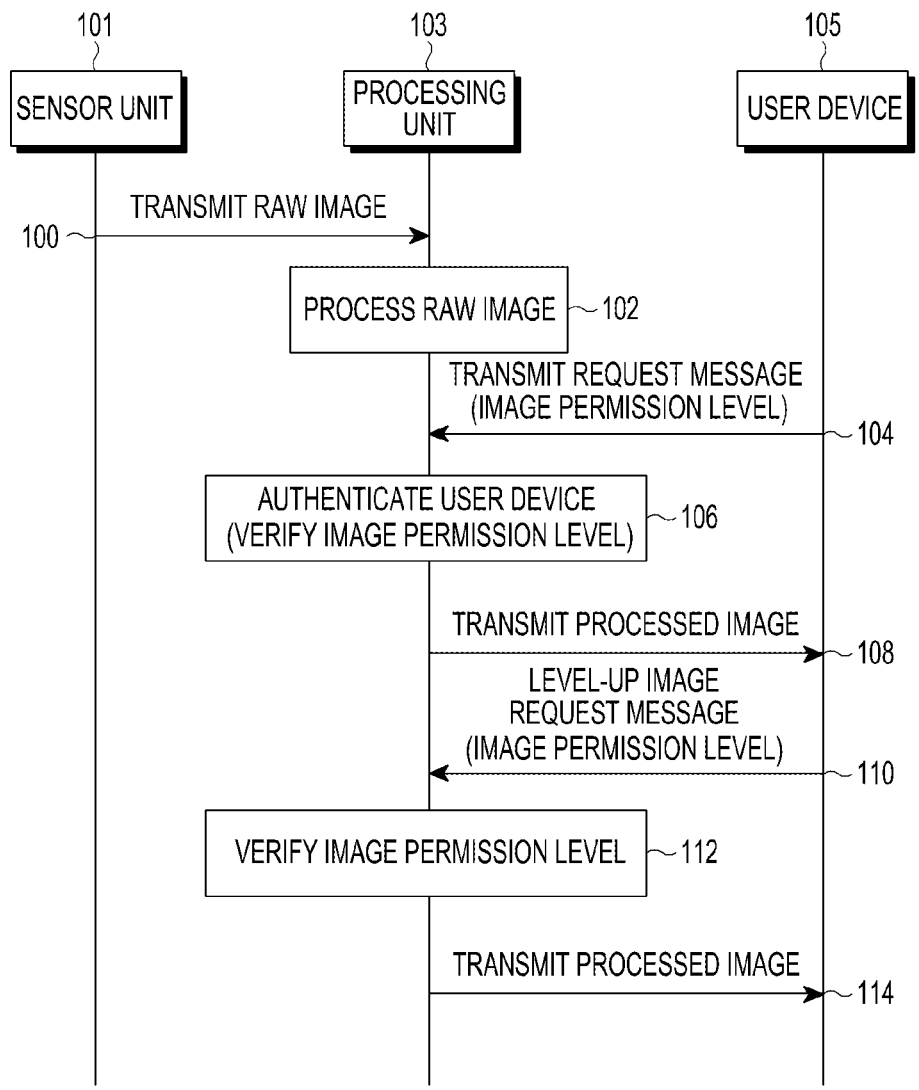
FIG. 1 is a signaling diagram illustrating an example of a procedure for transmitting a processed image to a user device according to an embodiment of the present disclosure.

Hereinafter, preferred embodiments of the present disclosure will be described in detail with reference to the accompanying drawings. In the following description of the present disclosure, a detailed description of well-known functions or elements associated with the present disclosure will be omitted if it unnecessarily obscures the subject matter of the present disclosure. The terms described below are defined in consideration of their functions in the present disclosure, and are subject to change depending on the intention or practice of the user or operator. Therefore, the definition should be made based on the contents throughout the entire description of the present disclosure.

According to various embodiments of the present disclosure, an electronic device may include a communication function. For example, the electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a MP3 player, a mobile medical device, a camera, a wearable device (e.g., a head-mounted device (HMD), electronic apparel, electronic bracelet, electronic necklace, electronic Appcessory, electronic tattoo, or smart watch), or the like.

According to various embodiments of the present disclosure, the electronic device may be a smart home appliance with a communication function. For example, the smart home appliance may be a television (TV), a digital video disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™) a gaming console, an electronic dictionary, a camcorder, an electronic photo frame, or the like.

According to various embodiments of the present disclosure, the electronic device may be a medical device (e.g., a magnetic resonance angiography (MRA) device, a magnetic resonance imaging (MRI)) device, a computed tomography (CT) device, an imaging device, or an ultrasonic device), a navigation device, a global positioning system (GPS) receiver, an event data recorder (EDR), a flight data recorder (FDR), an automotive infotainment device, a navigational electronic device (e.g., a sailing navigation device, a gyroscope, or a compass), an avionics device, a security device, an industrial or customer robot, or the like.

According to various embodiments of the present disclosure, the electronic device may be a combination of the above-described devices. Further, it will be apparent to those skilled in the art that the electronic device according to preferred embodiments of the present disclosure is not limited to the above-described devices.

In the below-described embodiment of the present disclosure, a method for enhancing the security of information transmitted by an IoT device, a wearable device, an e-health device, a smart home device or the like will be described in more detail.

In a detailed description of embodiments of the present disclosure, a $3^{rd}$ generation partnership project (3GPP)-based evolved packet system (EPS), a UMTS (universal mobile telecommunications system) radio access network (UTRAN), a GSM (global system for mobile communication) EDGE radio access network (GERAN), a wireless fidelity (Wi-Fi) network, and a Bluetooth network will be used. However, it will be understood by those skilled in the art that the subject matter of the present disclosure is also applicable to other communication systems having similar technical backgrounds with minor modifications without departing from the scope of the present disclosure.

FIG. 1 is a signaling diagram illustrating an example of a procedure for transmitting a processed image to a user device according to an embodiment of the present disclosure.

Referring to FIG. 1, the illustrated signaling diagram may include a sensor unit 101 for capturing (or shooting) an image, a processing unit 103 for processing the captured image, and a user device 105 that receives the image. In the example of FIG. 1, each of the sensor unit 101, the processing unit 103 and the user device 105 will be assumed to be configured as a separate unit. In some cases, however, the sensor unit 101 and the processing unit 103 may be configured as one unit, or all of the sensor unit 101, the processing unit 103 and the user device 105 may be configured as one unit.

Assuming a home network system, the sensor unit 101 may be, for example, a variety of cameras, or a camera connected to a home device, and the user device 105 may be, for example, a terminal or a control unit of the home network system.

Further, the home device may include smart appliances, security devices, lighting devices, energy devices and the like. For example, the smart appliance may be televisions (TVs), air conditioners, refrigerators, washers, robot cleaners, humidifiers and the like, and the security device may be door locks, security cameras, closed circuit televisions (CCTVs), security sensors and the like. The lighting device may be light emitting diode (LED) lamps and the like, and the energy device may be heating equipments, power meters, power sockets, electrical outlets, multi-taps and the like. Additionally, the home device may include personal computers (PCs), Internet protocol (IP) cameras, Internet phones, wired/wireless phones, electrically controllable curtains or blinds, and the like.

The sensor unit 101 may capture an image and transmit the captured raw image to the processing unit 103 (Operation 100).

The processing unit 103 may store the raw image transmitted from the sensor unit 101 in a temporary buffer or a memory unit embedded therein, and process the stored raw image (Operation 102). The storing operation and the processing operation for the raw image may be performed at the same time, or the processing operation may be performed after the storing operation is completed.

For example, a filtering scheme, a masking scheme, an arithmetic processing scheme and the like may be used for the processing of the raw image, and the processing unit 103 may split and encrypt the data related to the raw image based on the processing schemes. In particular, the processing unit 103 may process the data related to the raw image as information including only the target shooting subject, information including only the background, information including both of the background and the target shooting subject, and information obtained by encrypting the information including both of the background and the target shooting subject according to the security level and the privacy level. The 'privacy level' may be, for example, an image permission level, and the image permission level represents whether access to the processed image is permitted.

For example, the processing unit 103 may process to exclude the background except for the people, which are the target shooting subjects, from the raw image, to leave only the contours of all the shooting subjects on the raw image, to blur all the shooting subjects on the raw image based on the smoothing technique, or to replace the background except for the target shooting subjects with another background on the raw image through a shift operation or a convolutional operation.

Further, if the current situation is a predetermined emergency situation or an image permission level of the user device 105, to which the image is sent, indicates allowance of access to the raw image, the processing unit 103 may send the raw age to the user device 105 intact without performing the processing process of Operation 102. The predetermined emergency situation may include, for example, an occasion where the elderly or patient at home has a health problem, an occasion where there is an intruder in the house, or an occasion where gas leaks or fire occurs in the house. The occasion where the image permission level of the user device 105 indicates allowance of access to the raw image is an occasion where after undergoing an internal authentication process based on biological information such as fingerprints or heart rates recognized by a sensor unit embedded in the user device 105, the user device 105 is permitted to access the raw image depending on the authentication result.

The user device 105 may transmit a request message for requesting transmission of an image or personal information, to the processing unit 103 (Operation 104). The processing unit 103 may authenticate the user device 105 that has transmitted the request message (Operation 106). In other words, the processing unit 103 may determine whether the user device 105 is an authenticated device. Here, the reason for transmitting the request message to the processing unit 103, not to the sensor unit 101, is to prevent the user device 105 from accessing the raw image captured by the sensor unit 101, and enable the user device 105 to access only the image processed by the processing unit 103, thereby enhancing the security and the privacy protection.

The user device 105 may transmit information related to its own image permission level together with the request message in Operation 104. In this case, when determining in Operation 106 whether the user device 105 that has transmitted the request message is an authenticated device, the processing unit 103 may also verify information related to the image permission level included in the request message. A method of comparing the image permission level (i.e., the image permission level included in the request message) from the user device 105 with an image permission level that is permitted to the user device 105 by policy, may be used for the process of verifying the information related to the image permission level.

Various methods may be used for the process of authenticating a user device and/or verifying an image permission level in Operation 106, depending on the network environment (e.g., mobile communication environment, cellular communication environment, Bluetooth environment, WiFi environment and the like) of the user device 105. Therefore, a method based on various network environments may be used for the process of authenticating a user device and/or verifying an image permission level in the present disclosure.

If the authentication of the user device and/or the verification of the image permission level are completed, the processing unit 103 may transmit the processed image to the user device 105 (Operation 108). The 'processed image' in Operation 108 may be an image processed based on an image permission level indicated by the information related to the image permission level included in the request message, and may refer to an image, to which access by the user device 105 is permitted.

It is assumed in FIG. 1 that information related to an image permission level is included in a request message. However, the information related to the image permission level may not be included in the request message, and in this case, the processing unit 103 may transmit an image processed based on an image permission level with a default value to the user device 105. The image permission level with the default value may be set by the user, or may be the most powerful image permission level.

Meanwhile, the user device 105 may transmit a level-up image request message to the processing unit 103 (Operation 110), to request transmission of a more refined image than the image received in Operation 108. The level-up image request message may include information related to an image permission level higher than the image permission level indicated by the information related to the image permission level transmitted in Operation 104. In an embodiment of the present disclosure, it is assumed that if the image permission level is high, the access to the image processed similar to the raw image is permitted.

The processing unit 103 may verify the information related to the image permission level included in the level-up request message (Operation 112). Thereafter, if the verification of the information related to the image permission level is completed, the processing unit 103 may transmit the processed image to the user device 105 (Operation 114). In Operation 114, the processed image refers to an image processed based on the image permission level indicated by the information related to the image permission included in the level-up request message.

In FIG. 1, the operation of receiving a request message from the user device 105 after processing the raw image has been described by way of example. However, the operation (i.e., Operation 102) of processing the raw image may be performed after receiving the request message. In this case, upon receiving a request message including information related to an image permission level from the user device 105, the processing unit 103 may process the raw image based on the image permission level indicated by the information related to the image permission level included in the request message.

Figure 2:
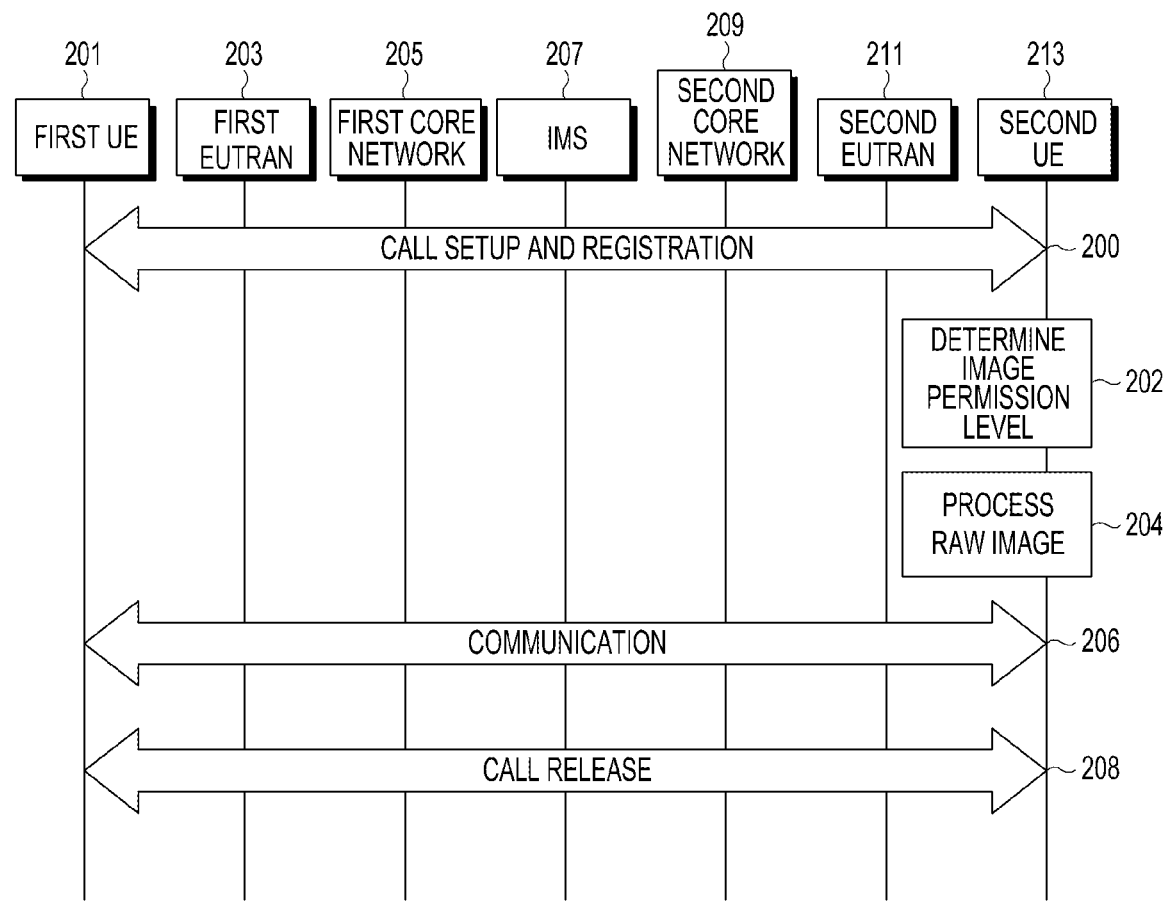
FIG. 2 is a signaling diagram illustrating an example of a call setup and release procedure performed between terminals according to an embodiment of the present disclosure.

FIG. 2 is a signaling diagram illustrating an example of a procedure for performing communication between terminals according to an embodiment of the present disclosure.

Referring to FIG. 2, the illustrated signaling diagram may include a first user equipment (UE) 201, a first evolved UTRAN (EUTRAN) 203, a first core network 205, an IP (Internet protocol) multimedia subsystem (IMS) 207, a second core network 209, a second EUTRAN 211, and a second UE 213.

Assuming a video call between the first UE 201 and the second UE 213, the first UE 201 may perform a call setup and registration procedure for a video call with the second UE 213 (Operation 200). The call setup and registration procedure may be performed by a plurality of entities included in the first EUTRAN 203, the first core network 205, the IMS 207, the second core network 209 and the second EUTRAN 211. However, since the call setup and registration procedure itself is not closely related to the present disclosure, it is simplified herein as shown in Operation 200.

The information related to an image permission level applied in the operation of processing a raw image may be set in Operation 200 through, for example, a session description protocol (SDP) parameter. In other words, the first UE 201 may request to change the image permission level applied to the processing operation to an image permission level higher or lower than a preset image permission level through an SDP parameter value, and the second UE 213 may transmit information indicating whether to permit the change in the image permission level together with a response to the request, making it possible to set the information related to the image permission level. Further, the information related to the image permission level may be set as an image permission level with a default value. The image permission level with a default level may be an image permission level set by the user, or may be the most powerful image permission level.

The information related to the image permission level applied in the operation of processing the raw image may be set through, as another example, a home subscriber server (HSS) in Operation 200. In other words, as the HSS fetches the information related to the image permission level with a default value set by the corresponding UE, the information related to the image permission level may be set. The information related to the image permission level set through the HSS may be changed in Operation 200.

Further, for example, a filtering scheme, a masking scheme, an arithmetic processing scheme and the like may be used for the processing of the raw image.

Upon completing the call setup and registration procedure with the first UE 201, the second UE 213 may determine an image permission level for a video call (Operation 202), and process a captured raw image based on the determined image permission level (Operation 204). The image permission level may be determined by the user's interface, or automatically determined by the stored image permission level and the image permission level that is permitted by policy.

Thereafter, the second UE 213 may transmit an image processed based on the image permission level determined in Operation 202 to the first UE 201, to perform communication (i.e., a video call) with the first UE 201 (Operation 206). After transmitting the processed image, the second UE 213 may perform a call release procedure with the first UE 201 to terminate the communication with the first UE 201 (Operation 208).

Figure 3:
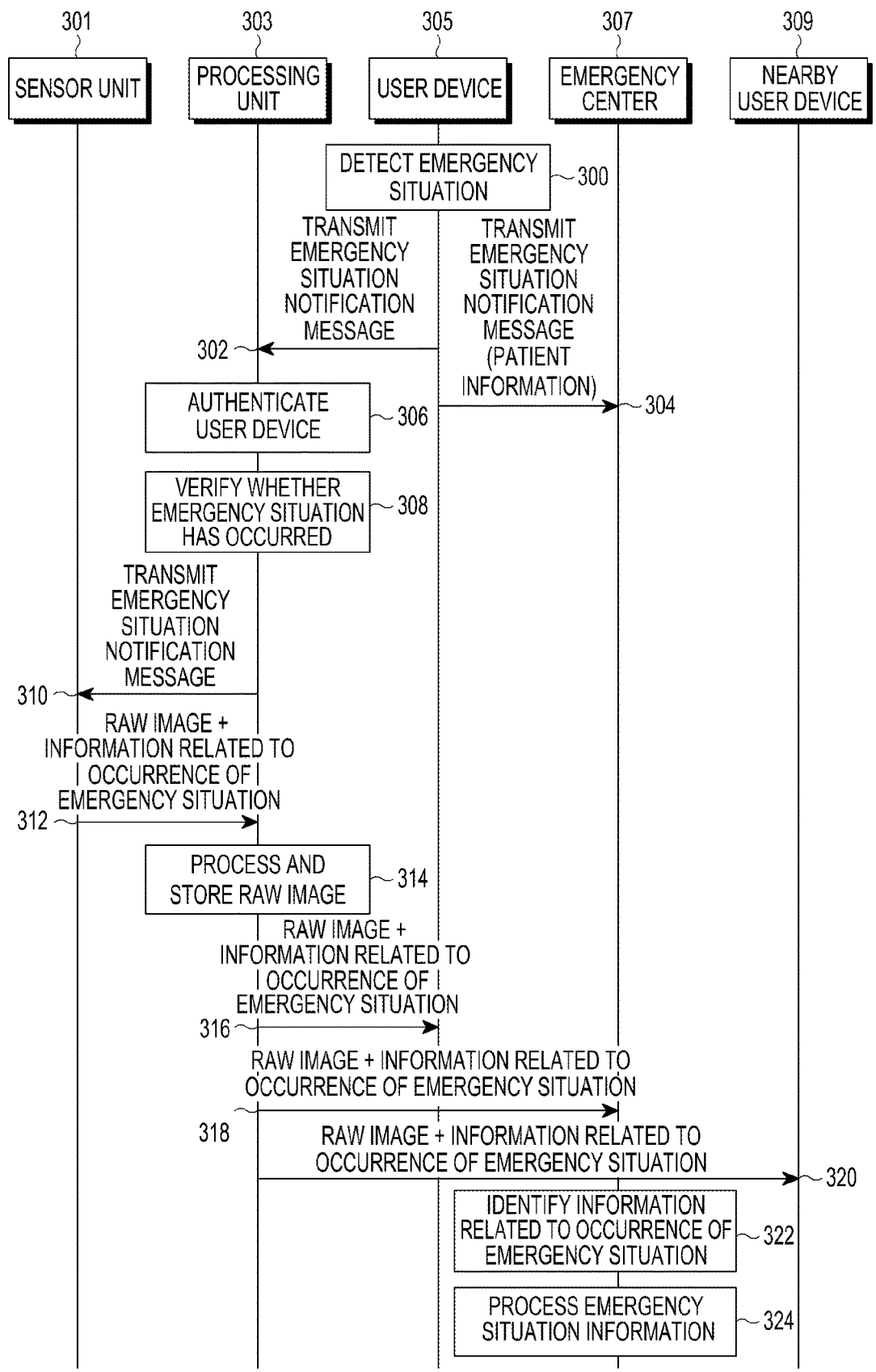
FIG. 3 is a signaling diagram illustrating an example of a procedure for transmitting a raw image to a user device, an emergency center and a nearby user device in an emergency situation according to an embodiment of the present disclosure.

FIG. 3 is a signaling diagram illustrating an example of a procedure for transmitting a raw image to a user device, an emergency center and a nearby user device in an emergency situation according to an embodiment of the present disclosure.

Referring to FIG. 3, the illustrated signaling diagram may include a sensor unit 301 for capturing an image, a processing unit 303 for processing the captured image; and a user device 305, an emergency center 307 and a nearby user device 309, each of which receives an image. Although it is assumed in FIG. 3 that each of the sensor unit 301, the processing unit 303 and the user device 305 is configured as a separate unit, however, in some cases, the sensor unit 301 and the processing unit 303 may be configured as one unit, or all of the sensor unit 301, the processing unit 303 and the user device 305 may be configured as one unit.

In FIG. 3, an emergency situation such as an occasion where a patient at home has a health problem in a home network system will be assumed. However, the procedure described in FIG. 3 may be applied to other emergency situations with minor changes.

If the user device 305 (e.g., a terminal, a wearable device, an e-health device and the like) detects an emergency situation where a patient at home has a health problem (Operation 300), the user device 305 may transmit an emergency situation notification message to the processing unit 303 to notify occurrence of the emergency situation (Operation 302). In other words, the user device 305 may notify the processing unit 303 of the occurrence of the emergency situation by transmitting information related to the occurrence of the emergency situation together with the emergency situation notification message. As for the occurrence of the emergency situation, as one example, an indicator indicating occurrence of an emergency situation may be transmitted together with the emergency situation notification message, or a specific bit among the bits constituting the emergency situation notification message may be set and transmitted for the notification.

Here, the reason for transmitting the emergency situation notification message to the processing unit 303, not to the sensor unit 301, is to prevent the user device 305 from accessing the raw image captured by the sensor unit 301, and enable the user device 305 to access only the image processed by the processing unit 303, thereby enhancing the security and the privacy protection.

Further, the user device 305 may transmit the emergency situation notification message and information about the patient at home to the emergency center 307 (Operation 304). The information about the patient may include a patient identifier (ID) for identifying the patient, and information related to the patient's health status measured by a wearable device, an e-health device and the like.

Upon receiving the notification indicating the occurrence of the emergency situation from the user device 305, the processing unit 303 may authenticate the user device 305 (Operation 306). In other words, the processing unit 303 may determine whether the user device 305 is an authenticated device.

As another example, the user device 305 may transmit information related to an image permission level together with the emergency situation notification message transmitted in Operation 302. In this case, when determining whether the user device 305 is an authenticated device, the processing unit 303 may also verify the information related to the image permission level included in the request message. A method of comparing the image permission level (i.e., the image permission level indicated by the information related to the image permission level included in the request message) that the user device 305 has requested to query, with a privacy level that is permitted to the user device 305 by policy, may be used for the process of verifying the information related to the image permission level.

Various methods may be used for the process of authenticating the user device and/or verifying the image permission level in Operation 306, depending on the network environment (e.g., mobile communication environment, cellular communication environment, Bluetooth environment, WiFi environment and the like) of the user device 305. Therefore, a method based on various network environments may be used for the process of authenticating a user device and/or verifying an image permission level in the present disclosure.

The processing unit 303 may verify whether an emergency situation has occurred, by determining whether an indicator indicating occurrence of an emergency situation is included in the emergency situation notification message received in Operation 302, or whether a specific bit is set, which is related to occurrence of an emergency situation, among the bits constituting the emergency situation notification message (Operation 308).

Upon determining or verifying the occurrence of the emergency situation, the processing unit 303 may transmit an emergency situation notification message to the sensor unit 301 to notify the occurrence of the emergency situation (Operation 310). In other words, the processing unit 303 may notify the sensor unit 301 of the occurrence of the emergency situation by transmitting information related to the occurrence of the emergency situation together with the emergency situation notification message. As an example of notifying the occurrence of the emergency situation, the user device 305 may transmit an indicator indicating the occurrence of the emergency situation together with the emergency situation notification message, or set and transmit a specific bit related to the occurrence of the emergency situation among the bits constituting the emergency situation notification message.

Upon receiving the notification indicating the occurrence of the emergency situation from the processing unit 303, the sensor unit 301 may transmit the captured raw image and the information related to the occurrence of the emergency situation to the processing unit 303 (Operation 312). The information related to the occurrence of the emergency situation may be, for example, an indicator indicating the occurrence of the emergency situation and a specific bit related to the occurrence of the emergency situation. The reason for transmitting the raw image and the information related to the occurrence of the emergency situation together in Operation 312 is to rapidly transmit the accurate information about the emergency situation in the subsequent procedures.

The processing unit 303 may store and process the raw image transmitted from the sensor unit 301 at the same time (Operation 314). For example, a filtering scheme, a masking scheme, an arithmetic processing scheme and the like may be used for the processing of the raw image. For example, the processing unit 303 may process to exclude the background except for the people, which are the target shooting subjects, from the raw image, to leave only the contours of all the shooting subjects on the raw image, to blur all the shooting subjects on the raw image based on the smoothing technique, or to replace the background except for the target shooting subjects with another background on the raw image through a shift operation or a convolutional operation.

Upon receiving the information related to the occurrence of the emergency situation from the sensor unit 301, the processing unit 303 may transmit the raw image intact to each of the user device 305, the emergency situation 307 and the nearby user device 309 without performing the processing operation of Operation 314. Therefore, the processing operation (Operation 314) in the emergency situation may be omitted, or performed at the same time with the process of transmitting the raw image to each of the user device 305, the emergency situation 307 and the nearby user device 309.

In other words, upon receiving the information related to the occurrence of the emergency situation from the sensor unit 301, the processing unit 303 may transmit the raw image and the information related to the occurrence of the emergency situation to the user device 305 (e.g., a terminal, a wearable device, an e-health device and the like) (Operation 316).

Further, upon receiving the information related to the occurrence of the emergency situation from the sensor unit 301, the processing unit 303 may transmit the raw image and the information related to the occurrence of the emergency situation to the emergency center 307 (Operation 318). In this case, the processing unit 303 may transmit at least one of a patient ID, a wearable device ID of the patient, and an e-health device ID of the patient to emergency center 307 so that the first aid treatment may be given to the patient at the emergency center. The transmission operation by the processing unit 303 in Operation 318 may be performed using an ID or IP address of the emergency center, which is registered in the processing unit 303, or an ID or IP address of the emergency center, which is transmitted from the user device 305.

Further, upon receiving the information related to the occurrence of the emergency situation from the sensor unit 301, the processing unit 303 may transmit the raw image and the information related to the occurrence of the emergency situation to a predetermined nearby user device 309 (Operation 320). The nearby user device 309 may be a user device of the patient's family, relatives or neighbors, and the transmission operation by the processing unit 303 in Operation 320 may be performed using communication Ds or IP addresses of the patient's family, relatives or neighbors, which are registered in the processing unit 303, or communication IDs or IP addresses of patient's family, relatives or neighbors, which transmitted from the user device 305.

Although it is assumed in FIG. 3 that Operations 316, 318 and 320 are performed in sequence, Operations 316, 318 and 320 may be performed in parallel.

The emergency center 307 may identify the information related to the occurrence of the emergency situation, which is transmitted from the processing unit 303, and authenticate a patient ID, a wearable device ID of the patient and an e-health device ID of the patient, which are additionally transmitted (Operation 322).

Thereafter, the emergency center 307 may process the emergency situation information such as the patient information received in Operation 304 and the raw image received in Operation 320 (Operation 324). The processed emergency situation information may be used to perform the most appropriate first aid for the patient. In other words, the processed emergency situation information may be used to perform the first aid such as sending the necessary medical staff or an ambulance to the patient.

Figure 4:
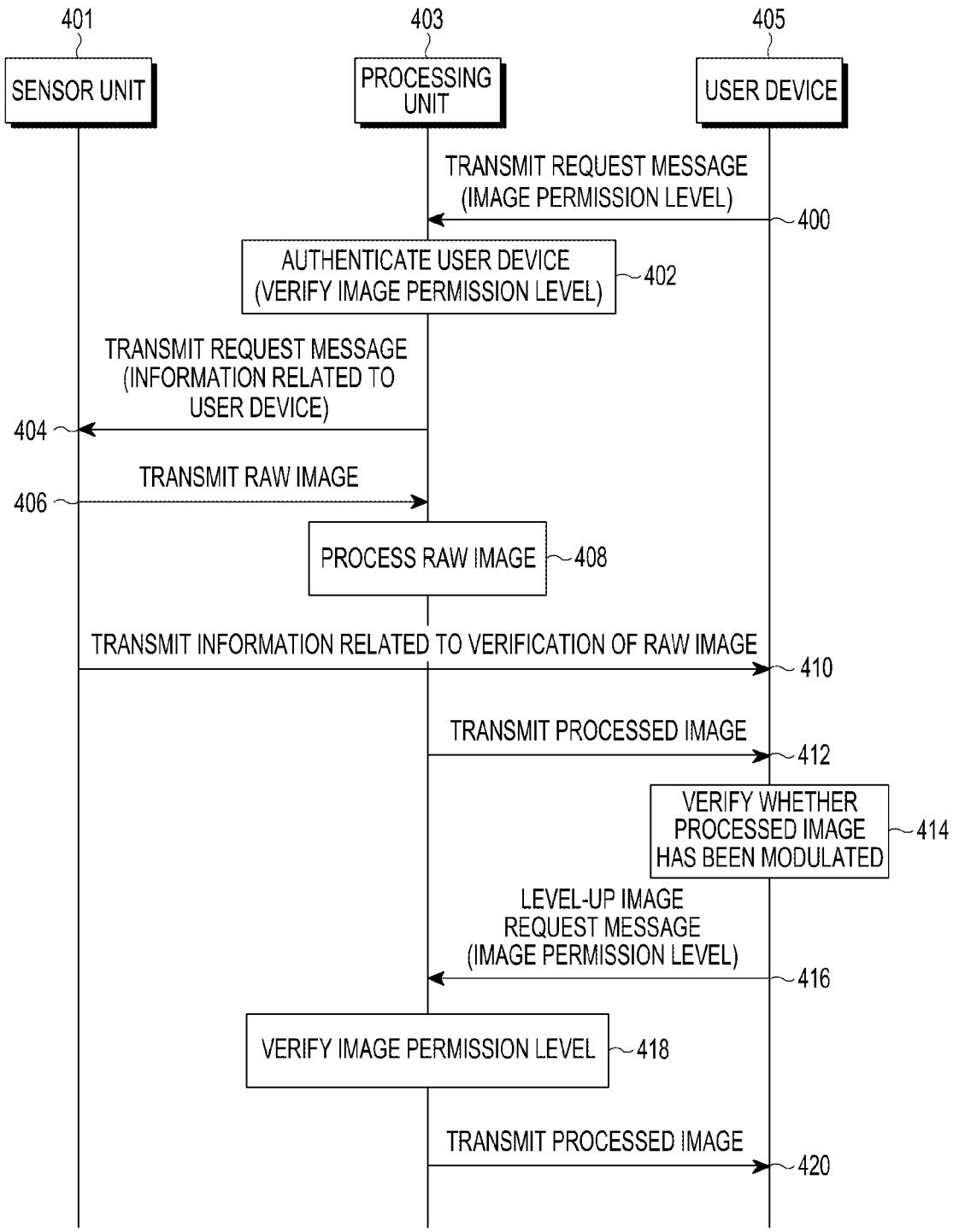
FIG. 4 is a signaling diagram illustrating an example of a procedure for detecting modulation of a processed image according to an embodiment of the present disclosure.

FIG. 4 is a signaling diagram illustrating an example of a procedure for detecting modulation of a processed image according to an embodiment of the present disclosure.

Referring to FIG. 4, the illustrated signaling diagram may include a sensor unit 401 for capturing an image, a processing unit 403 for processing the captured image, and a user device 405 for receiving the image. It is assumed in FIG. 4 that each of the sensor unit 401, the processing unit 403 and the user device 405 is configured as a separate unit. However, in some cases, the sensor unit 401 and the processing unit 403 may be configured as one unit, or all of the sensor unit 401, the processing unit 403 and the user device 405 may be configured as one unit.

Assuming a home network system, the sensor unit 401 may be, for example, a variety of cameras, or a camera connected to a home device, and the user device 405 may be, for example, a terminal or a control unit of the home network system.

The user device 405 may transmit a request message for requesting transmission of an image or personal information, to the processing unit 403 (Operation 400). The processing unit 403 may authenticate the user device 405 that has transmitted the request message (Operation 402). In other words, the processing unit 403 may determine whether the user device 405 is an authenticated device. Here, reason for transmitting the request message to the processing unit 403, not to the sensor unit 401, is to prevent the user device 405 from accessing the raw image captured by the sensor unit 401, and enable the user device 405 to access only the image processed by the processing unit 403, thereby enhancing the security and the privacy protection.

As another example, the user device 405 may transmit information related to an image permission level together with the request message in Operation 400. In this case, when determining whether the user device 405 that has transmitted the request message in Operation 400 is an authenticated device, the processing unit 403 may also verify the information related to the image permission level included in the request message. A method of comparing the image permission level (i.e., the image permission level included in the request message) from the user device 405, with an image permission level that is permitted to the user device 405 by policy, may be used for the process of verifying the information related to the image permission level.

Various methods may be used for the process of authenticating a user device and/or verifying an image permission level in Operation 402, depending on the network environment (e.g., mobile communication environment, cellular communication environment, Bluetooth environment, WiFi environment and the like) of the user device 405. Therefore, a method based on various network environments may be used for the process of authenticating a user device and/or verifying an image permission level in the present disclosure.

If the authentication of the user device and/or the verification of the image permission level are completed, the processing unit 403 may transmit a request message for requesting transmission of an image or personal information, to the sensor unit 401 (Operation 404). The request message may include information related to the user device 405 (e.g., an ID, an IP address and a communication ID of the user device 405), so the sensor unit 401 may detect data modulation at the user device 405.

Upon receiving the request message from the processing unit 403, the sensor unit 401 may transmit the captured raw image to the processing unit 403 (Operation 406).

The processing unit 403 may perform the processing operation while storing the raw image, or perform the processing operation after completing the storing operation (Operation 408). For example, a filtering scheme, a masking scheme, an arithmetic processing scheme and the like may be used for the processing of the raw image, and the processing unit 403 may split and encrypt the data related to the image. In particular, the processing unit 403 may process the data related to the raw image as information including only the shooting subject, information including only the background, information including both of the background and the shooting subject, and information obtained by encrypting the information including both of the background and the shooting subject according to the security level and the image permission level.

For example, the processing unit 403 may process to exclude the background except for the people, which are the target shooting subjects, from the raw image, to leave only the contours of all the shooting subjects on the raw image, to blur all the shooting subjects on the raw image based on the smoothing technique, or to replace the background except for the target shooting subjects with another background on the raw image through a shift operation or a convolutional operation.

The sensor unit 401 may transmit information related to the raw image transmission (e.g., information related to a time stamp and a random number) to the user device 405, so the user device 405 may verify data modulation (Operation 410).

Thereafter, the processing unit 403 may transmit an image processed based on an image permission level indicated by the information related to the image permission level included in the request message received in Operation 400, to the user device 405 (Operation 412). Here, it is assumed that the information related to the image permission level is included in the request message. However, if the information related to the image permission level is not included in the request message, the processing unit 403 may transmit an image processed based on an image permission level with a default value to the user device 405. The image permission level with a default value may be set by the user, or may be the most powerful image permission level.

The user device 405 may verify modulation/non-modulation of the processed image received in Operation 412 (Operation 414). The verification operation of Operation 414 may be performed using the information related to the time stamp and the random number, which is received in Operation 410. In other words, the user device 405 may compare the time stamp and random number indicated by the information related to the raw image transmission, which is received in Operation 410, with the time stamp and the random number for the processed image received in Operation 412. If the time stamp and the random number of the raw image are different from the time stamp and the random number of the processed image, the user device 405 may consider that the processed image is modulated. Upon determining that the processed image is modulated, the user device 405 may perform an error detection operation for the transmission process of the processing unit 403, without trusting the processed image received in Operation 412.

Meanwhile, the user device 405 may transmit a level-up image request message to the processing unit 403 (Operation 416), to request transmission of a more refined image than the processed image received in Operation 412. The level-up request message may include information related to an image permission level higher than the image permission level indicated by the information related to the image permission level, which is transmitted in Operation 400. In an embodiment of the present disclosure, it is assumed that if the image permission level is high, the access to the image processed similar to the raw image is permitted.

The processing unit 403 may verify the information related to the image permission level included in the level-up image request message (Operation 418). Thereafter, if the verification of the information related to the image permission level is completed, the processing unit 403 may transmit the processed image to the user device 405 (Operation 420). The processed image in Operation 420 means an image processed based on the image permission level indicated by the information related to the image permission level included in the level-up request message.

Figure 5:
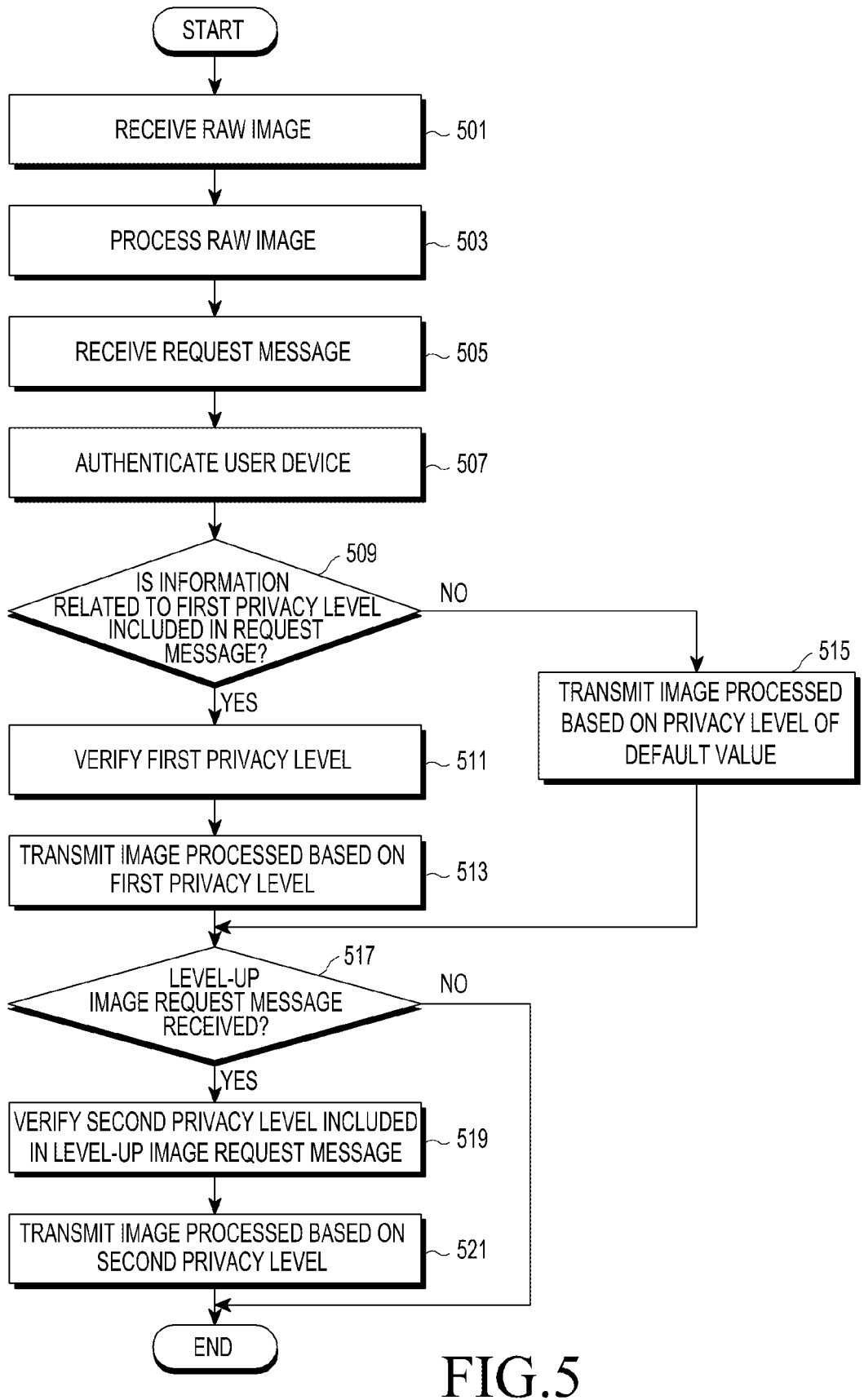
FIG. 5 is a flowchart illustrating a process of transmitting a filtered image to a user device by a processing unit according to an embodiment of the present disclosure.

FIG. 5 is a flowchart illustrating a process of transmitting a processed image to a user device by a processing unit according to an embodiment of the present disclosure.

Referring to FIG. 5, the processing unit may receive a captured raw image from the sensor unit in Operation 501, and process the raw image based on predetermined privacy levels in Operation 503. For example, a filtering scheme, a masking scheme, an arithmetic processing scheme and the like may be used for the processing of the raw image.

In Operation 505, the processing unit may receive a request message for requesting transmission of an image or personal information from the user device. In Operation 507, the processing unit may authenticate the user device that has transmitted the request message. In other words, the processing unit may determine whether the user device is an authenticated device.

The processing unit may determine in Operation 509 whether information related to a first privacy level is included in the request message received in Operation 505. If it is determined in Operation 509 that the information related to the first privacy level is included in the request message, the processing unit may verify the first privacy level indicated by the information related to the first privacy level in Operation 511. In Operation 513, the processing unit may transmit an image processed based on the verified first privacy level to the user device.

If it is determined in Operation 509 that the information related to the first privacy level is not included in the request message, the processing unit may transmit an image processed based on a privacy level with a default value to the user device in Operation 515. The privacy level with a default value may be set by the user, or may be the most powerful image permission level.

Meanwhile, the processing unit may determine in Operation 517 whether a level-up image request message for requesting transmission of a more refined image (i.e., an image similar to the raw image) than the processed image transmitted in Operation 513 is received. If it is determined in Operation 517 that the level-up image request message is not received from the user device, the processing unit may end the ongoing operation.

However, if it is determined in Operation 517 that the level-up image request message is received from the user device, the processing unit may verify a second privacy level indicated by information related to the second privacy level included in the level-up image request message in Operation 519. Here, the second privacy level means a level to permit access to a more refined image (i.e., an image similar to the raw image) than the first privacy level. In Operation 521, the processing unit may transmit an image processed based on the second privacy level to the user device.

It is assumed in FIG. 5 that the processing unit receives the request message from the user device after performing the raw image processing. However, the operation (i.e., Operation 503) of processing the raw image may be performed after the processing unit receives the request message. In this case, the processing unit may receive the request message including the information related to the privacy level from the user device, and process the raw image based on the image permission level indicated by the information related to the image permission level included in the request message.

Figure 6:
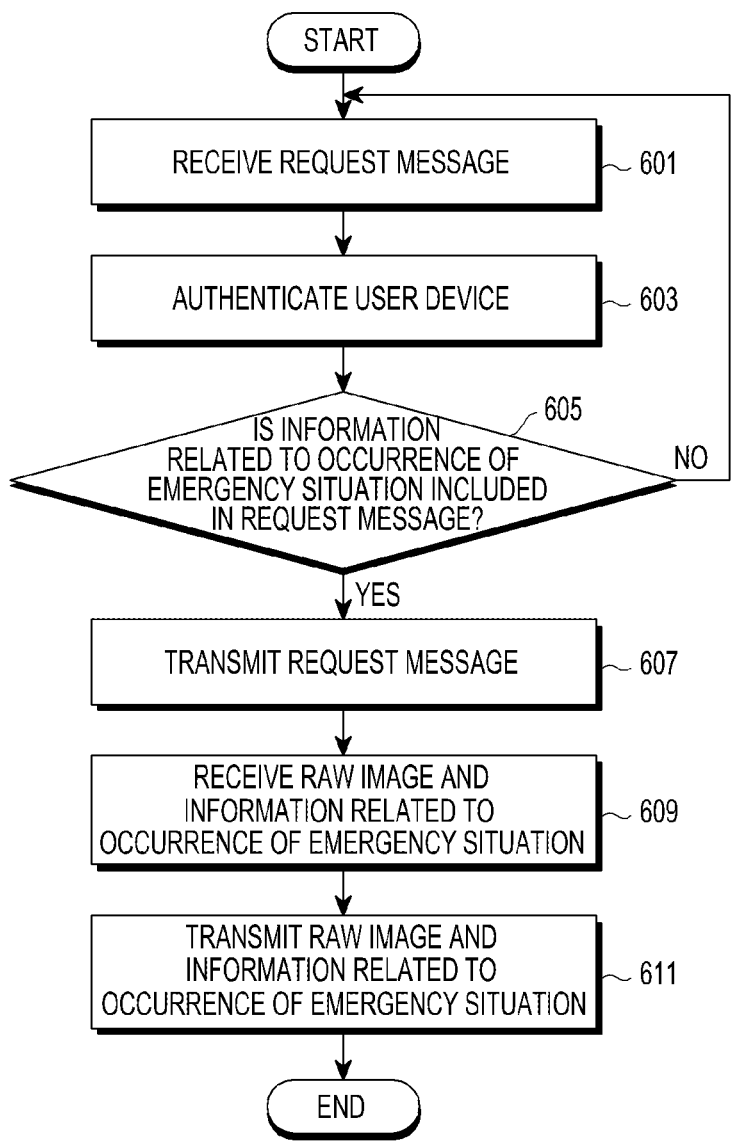
FIG. 6 is a flowchart illustrating a process of transmitting, by a processing unit, a raw image to a user device, an emergency center and a nearby user device in an emergency situation according to an embodiment of the present disclosure.

FIG. 6 is a flowchart illustrating a process of transmitting a raw image to a user device, an emergency center and a nearby user device in an emergency situation according to an embodiment of the present disclosure.

Referring to FIG. 6, the processing unit may receive a request message for requesting transmission of an image or personal information from the user device in Operation 601, and determine in Operation 603 whether the user device that has transmitted the request message is an authenticated device.

The processing unit may determine in Operation 605 whether information related to occurrence of an emergency situation is included in the request message received in Operation 601. Here, an emergency situation of an occasion where a patient at home has a health problem in a home network system will be assumed. Information related to occurrence of the emergency situation may be expressed as, for example, an indicator indicating the occurrence of the emergency situation, and a specific bit related to the occurrence of the emergency situation. If it is determined in Operation 605 that information related to the occurrence of the emergency situation is not included in the request message, the processing unit may return to Operation 601 and wait to receive a request message.

If it is determined in Operation 605 that the information related to the occurrence of the emergency situation is included in the request message, the processing unit may transmit the request message including the information related to the occurrence of the emergency situation to the sensor unit in Operation 607.

In Operation 609, the processing unit may receive a captured raw image and information related to the occurrence of the emergency situation from the sensor unit in response to the request message. In Operation 611, the processing unit may transmit the received raw image and information related to the occurrence of the emergency situation to at least one of the user device, the emergency center and the nearby user device. In this case, the processing unit may additionally transmit at least one of a patient ID, a patient's wearable device ID and a patient's e-health device ID so that the first aid treatment may be given to the patient at the emergency center.

Figure 7:
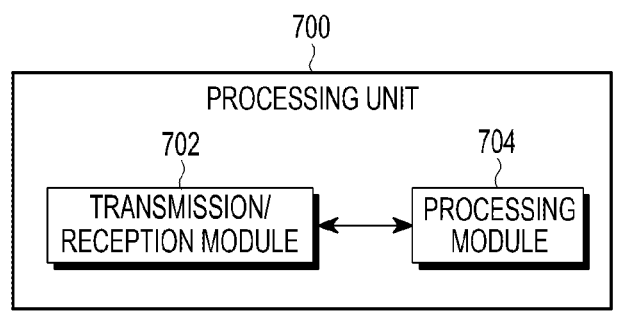
FIG. 7 is a block diagram illustrating an internal structure of a processing unit for enhancing data security according to an embodiment of the present disclosure.

FIG. 7 is a block diagram illustrating an internal structure of a processing unit for enhancing data security according to an embodiment of the present disclosure.

Referring to FIG. 7, an illustrated processing unit 700 is shown as a separate unit. However, each of the processing unit 700, the sensor unit and the user device may be configured as a separate unit according to the application example, and the sensor unit and the processing unit 700 may be configured as one unit. Otherwise, all of the sensor unit, the processing unit 700 and the user device may be configured as one unit.

The illustrated processing unit 700 may include a transmission/reception module 702 and a processing module 704. The processing module 704 may be involved in the overall operation of the processing unit 700. In particular, the processing module 704 may be adapted to perform the overall operation related to the enhancement of the data security according to an embodiment of the present disclosure. Here, the overall operation related to the enhancement of the data security is as described in FIGS. 1 to 6, so a description thereof will be omitted.

The transmission/reception module 702 may transmit various messages under control of the processing module 704. Here, the various messages transmitted by the transmission/reception module 702 are as described in FIGS. 1 to 6, so a description thereof will be omitted.

Figure 8A:
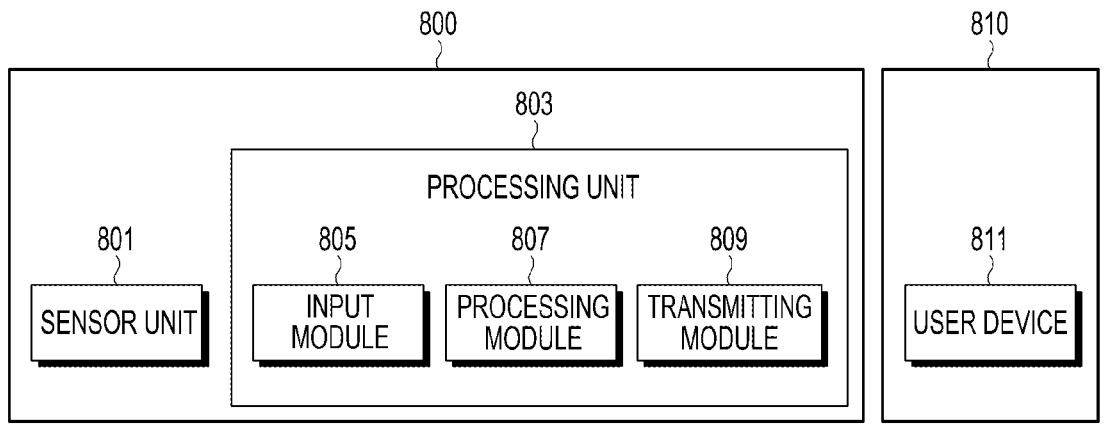
FIGS. 8A to 8C are diagrams illustrating examples of implementing a processing unit for enhancing data security according to an embodiment of the present disclosure.
Figure 8B:
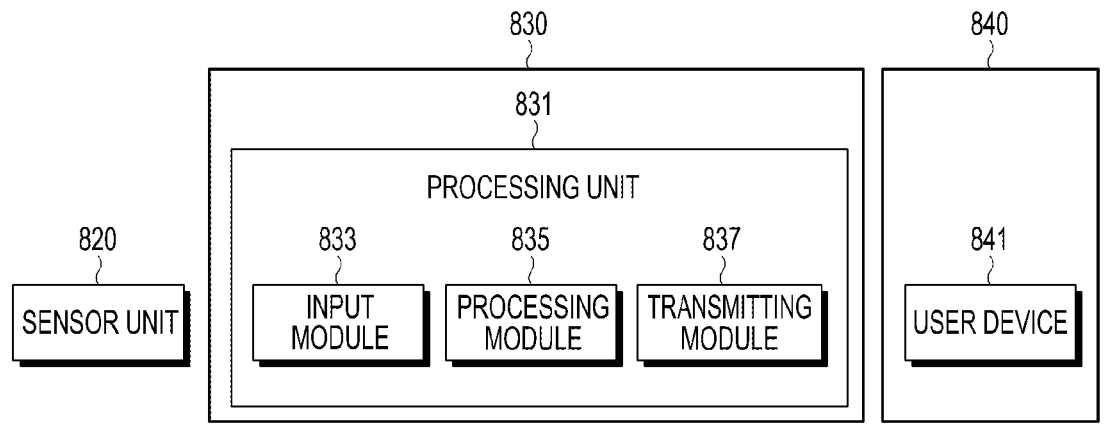
Figure 8C:
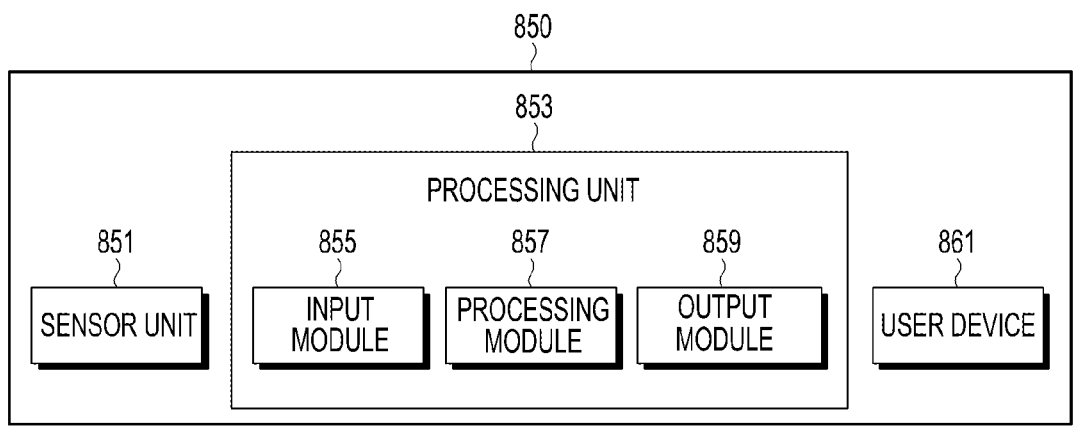

FIGS. 8A to 8C are diagrams illustrating examples of implementing a processing unit for enhancing data security according to an embodiment of the present disclosure.

FIG. 8A illustrates an example in which a sensor unit 801 and a processing unit 803 are configured as one unit 800. The processing unit 803 may include an input module 805 for inputting or receiving data from a sensor, a processing module 807, and a transmitting module 809 for transmitting data to a display of the user device 811 of unit 810.

The configuration of FIG. 8A may be applied to a robot cleaner on which a sensor such as a camera is mounted, or a refrigerator on which the sensor is mounted. A user device 811, of the unit 810, is configured as a separate entity may be an electronic device such as, for example, a wearable device and an e-health device.

FIG. 8B illustrates an example in which a sensor unit 820, a processing unit 831 and a user device 841 are configured as respective units 820, 830 and 840. The processing unit 831 may include an input module 833, a processing module 835, and a transmitting module 837.

The configuration of FIG. 8B may be applied to a case where the user device is configured as a separate entity in terms of the security of personal data, or of the privacy. The user device 841 configured as a separate entity may be an electronic device such as, for example, a wearable device and an e-health device. The user device 305 in FIG. 3 may correspond to a user device configured as a separate entity.

Assuming that the user device 841 is configured with other function blocks, not configured as a separate entity, the user device 841 may be, for example, a smart phone or the like. The user device 105 in FIG. 1 may correspond to a user device configured with other function blocks.

FIG. 8C illustrates an example in which all of a sensor unit 851, a processing unit 853 and a user device 861 are configured as one unit 850. The processing unit 853 may include an input module 855, a processing module 857, and an output module 859 or a transmitting module for transmitting data to a display part as a display of the user device is mounted in one unit. Depending on the implementation, if the processing unit 853 is implemented in the form of an internal interface, the processing unit 853 may be implemented in the form of an output module, and if the processing unit 853 is implemented in the form of performing data transmission, the processing unit 853 may be implemented in the form that has characteristics of a transmitting module. The configuration of FIG. 8C may be applied to a device such as a smart phone, a mobile phone, and a tablet device, or to a device with the mobility such as high-performance/high-end webcam or a robot cleaner.

Figure 9:
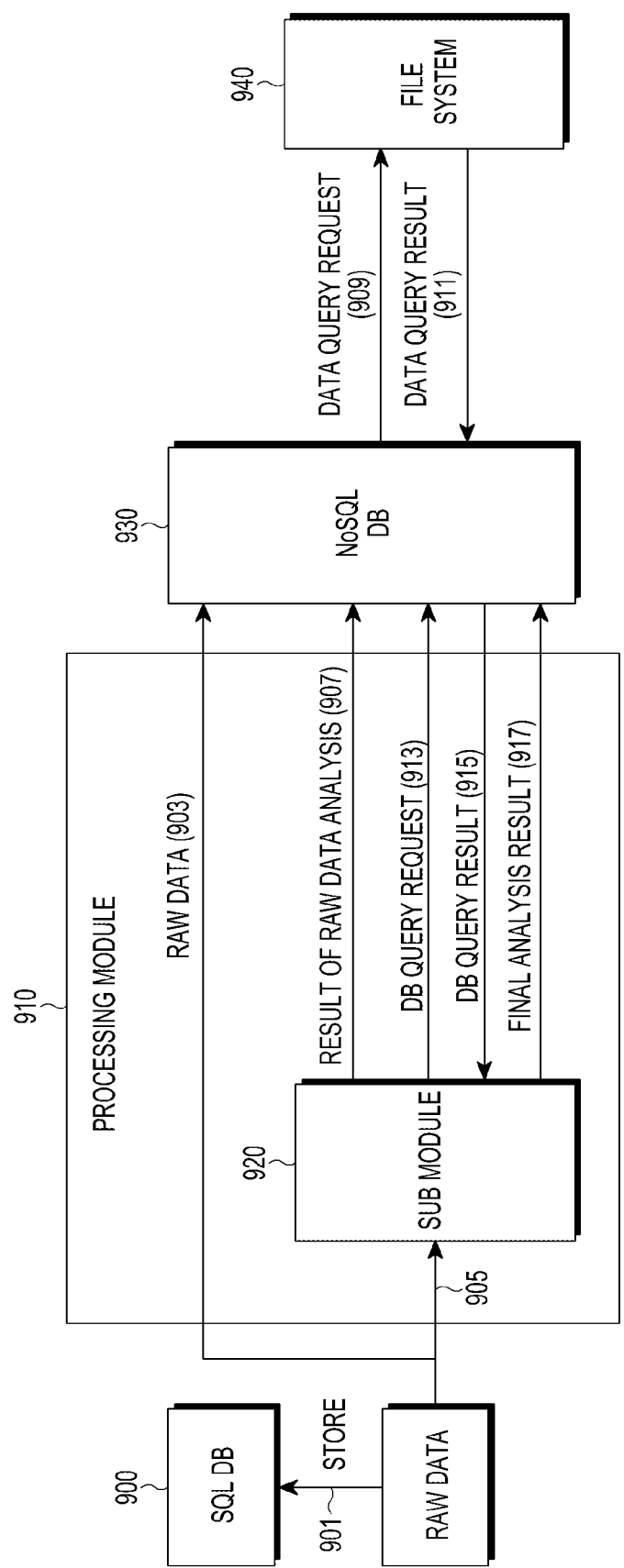
FIG. 9 is a diagram illustrating an example of processing data according to an embodiment of the present disclosure.

FIG. 9 is a diagram illustrating an example of processing data according to an embodiment of the present disclosure. Particularly, in FIG. 9, a flow of a case where data is processed on the cloud will be assumed.

Referring to FIG. 9, raw data may be stored in a structured query language (SQL) database (DB) 900 (Operation 901), or stored in a not-only SQL (NoSQL) DB 930 through a processing module 910 (Operation 903), or the raw data may be input to a sub module 920 of the processing module 910 (Operation 905), and analyzed through the sub module. The raw data may be collected through a sensor unit, or an application or web page of a user device. The NoSQL DB 930 may store the data, interworking with a file system 940, or store the data independently.

The reason for storing the raw data in the SQL DB 900 in Operation 901 is to facilitate data query through storing of structured data.

Further, when the raw data is stored in the NoSQL DB 930 in Operation 903, unstructured data may be stored using at least one of the NoSQL DB 930 and the file system 940. In other words, clues for data search may be stored in the NoSQL DB 930 that stores unstructured data, and actual data such as multimedia data may be stored using the file system 940. During data query, the NoSQL DB 930 may transmit a data query request to the file system 940 (Operation 909), and the file system 940 may transmit the data query result to the NoSQL DB 930 (Operation 911).

Further, when the sub module 920 of the processing module 910 analyzes raw data, the sub module 920 may analyze the raw data with a way to store the result using map-reduce. In other words, the sub module 920 may analyze the data by generating data having new keys and new values by processing the raw data, and grouping the data having the same key value through a process of shuffling or sorting the generated data.

The intermediate result value of the raw data analysis may be stored in the NoSQL DB 930 (Operation 907). The NoSQL DB 930 of Hbase, Mango DB, Apache and the like may be used for the NoSQL DB 930. If a DB query request occurs during the analysis process, the sub module 920 may send a DB query request to the NoSQL 930 (Operation 913), and receive the DB query result in response thereto (Operation 915). Thereafter, the sub module 920 may transmit the final analysis result obtained considering the received DB query result, to the NoSQL DB 930 (Operation 917).

Figure 10:
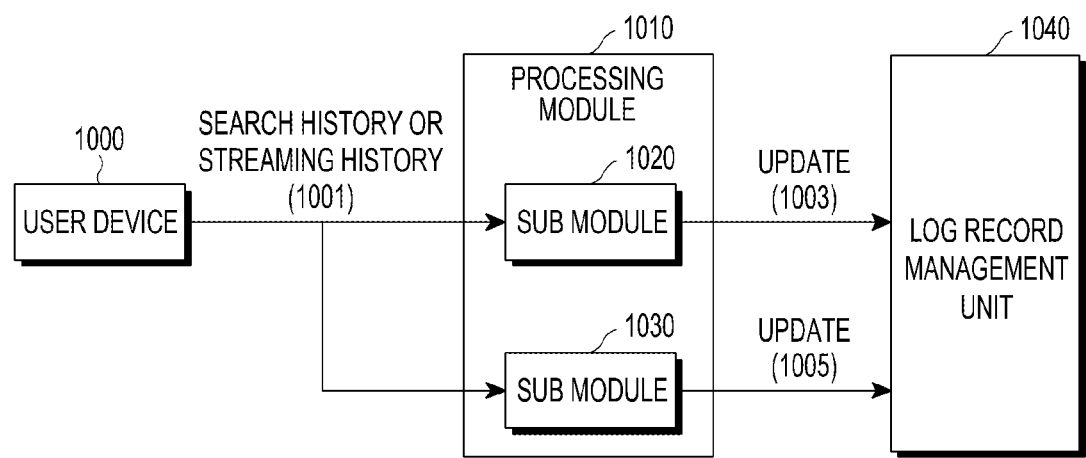
FIG. 10 is a diagram illustrating another example of processing data according to an embodiment of the present disclosure.

FIG. 10 is a diagram illustrating another example of processing data according to an embodiment of the present disclosure. Particularly, in FIG. 10, a flow of a case where data is processed on the cloud will be assumed.

Referring to FIG. 10, if raw data collected through a sensor unit, or an application or web page of a user device is multimedia data, a user device 1000 or a sensor unit (not shown) may transmit additional information such as streaming history or search history 1001 to sub modules 1020 and 1030 of a processing module 1010, respectively.

The sub module 1020 may count specific search histories based on the received additional information, and update the information stored in a log record management unit 1040 based on the result value (Operation 1003), to manage the user log records. Further, the sub module 1030 may increase the count corresponding to a specific category based on the received additional information, and update the information stored in the log record management unit 1040 based on the category log value indicating degree of the similarity (Operation 1005), to manage the user log records.

While the invention has been shown and described with reference to certain preferred embodiments thereof, it will be understood by those skilled in the art that various changes and modifications may be made therein without departing from the spirit and scope of the invention. Therefore, the scope of the present invention should not be limited by the illustrated embodiments, but should be determined by the scope of the appended claims and equivalents thereof.

It will also be appreciated that the method and apparatus for enhancing data security according to embodiments of the present disclosure may be implemented in hardware, software, or a combination of hardware and software. Such arbitrary software may be stored in a volatile or nonvolatile storage device such as, for example, erasable/rewritable ROM, a memory such as, for example, RAM, memory chip, memory device or IC, or an optically/magnetically writable machine (e.g., computer)-readable storage medium such as, for example, CD, DVD, magnetic disc or magnetic tape. The graphic screen update od of the present disclosure may be implemented by a computer or a mobile terminal including a control unit and a memory, and the memory is an example of a machine readable storage medium suitable for storing a program or programs including instructions embodying the embodiments of the present disclosure.

Accordingly, the invention may include a program comprising code for implementing the apparatus or method as claimed in any of the claims herein, and a machine (e.g., computer)-readable storage medium for storing such a program. In addition, such a program may be electronically transported through any medium, such as a communication signal carried over a wired or wireless connection, and the present invention appropriately includes equivalents thereof.

In the embodiment of the present disclosure, the program may be received and stored from a device for enhancing data security. The program providing apparatus may include a memory for storing a program including instructions for causing the graphic processing apparatus to perform a predetermined content protection method, and information necessary for the content protection method, a communication unit for performing wired or wireless communication with the graphic processing apparatus, and a control unit for transmitting the program to the transmission/reception apparatus automatically or at the request of the graphic processing apparatus.

The invention claimed is:

1. A method for enhancing data security performed by a first terminal, comprising:
   receiving, by a transceiver, a message requesting an image from a second terminal, the message including a first privacy level related to processing of the image;
   authenticating, by a processor, the second terminal, after the message is received from the second terminal;
   in response to authenticating the second terminal, verifying, by the processor, the first privacy level included in the message corresponds to a privacy level associated with the second terminal;
   after the second terminal is authenticated, obtaining, by the processor, a first image based on the message, wherein the first image is processed according to the verified first privacy level;
   transmitting, by the transceiver, to the second terminal, the first image;
   receiving, by the transceiver, a level-up request message from the second terminal, the level-up request message including information related to a second privacy level allowing access to an image similar to a raw image before being processed rather than the first image processed based on the first privacy level; and
   transmitting, by the transceiver, to the second terminal, a second image processed based on the second privacy level among processed images, if the verification of the information related to the second privacy level is completed,
   wherein, if an emergency situation notification message including an indicator indicating occurrence of an emergency situation is received, by the transceiver, from the second terminal while the method is performed, the method further comprises:
   authenticating, by the processor, the second terminal;
   verifying, by the processor, whether the emergency situation has occurred based on the indicator;
   transmitting, from the processor to a sensor unit, a notification of the emergency situation including the indicator indicating occurrence of the emergency situation received from the second terminal;
   transmitting, from the sensor unit to the processor, the raw image and information related to the emergency situation; and
   transmitting, by the transceiver, the raw image and the information related to the emergency situation to the second terminal, an emergency center and a nearby terminal, regardless of the first privacy level and the second privacy level.

2. The method of claim 1, wherein:
   a plurality of privacy levels include a plurality of image permission levels, the plurality of image permission levels indicate whether access to the processed images is permitted,
   when one of the plurality of image permission levels is high, the access to one of the processed images that is similar to the raw image is permitted.

3. The method of claim 1, wherein verifying the first privacy level includes comparing, by the processor, the first privacy level included in the message with another privacy level that is permitted to the second terminal by a policy.

4. The method of claim 1, further comprising transmitting, by the transceiver, to the second terminal, an image that is processed based on a privacy level with a default value, when the message does not include the first privacy level.

5. The method of claim 1, further comprising previously setting, by the processor, the first privacy level in a call setup and registration procedure through a session description protocol (SDP) parameter or a home subscriber server (HSS).

6. The method of claim 1, further comprising, when transmitting, by the transceiver, the raw image and the information related to the emergency situation to the emergency center, transmitting at least one of an identifier (ID) of a patient, a wearable device ID of the patient, and an health device ID of the patient.

7. The method of claim 1, further comprising processing the raw image based on a plurality of privacy levels,
wherein processing the raw image includes one of:
excluding a remaining background except for a target shooting subject from the raw image,
leaving only contours of shooting subjects on the raw image,
processing the raw image based on a smoothing technique, and
replacing the remaining background except for the target shooting subject with another background on the raw image.

8. The method of claim 1, further comprising transmitting, la the transceiver, to the second terminal, at least one of information related to a time stamp and information related to a random number for the raw image,
wherein at least one of the time stamp and the random number for the raw image are used to determine whether a processed image is modulated.

9. The method of claim 1, further comprising:
storing, by the processor, raw data in a first database; and
storing, by the processor, the raw data in a second database interworking with a file system, storing the raw data in the second database, or storing an analysis result obtained by analyzing the raw data in the second database.

10. The method of claim 9, further comprising:
receiving, by the transceiver, additional information from the second terminal or the sensor unit, when the raw data is multimedia data; and
managing, by the transceiver, usage logs or log records for similar data based on the additional information.

11. A first terminal comprising:
a transceiver;
a sensor unit; and
a processor configured to:
receive, via the transceiver, a message requesting an image from a second terminal, the message including a first privacy level related to processing of the image,
authenticate the second terminal, after the message is received from the second terminal,
in response to authenticating the second terminal, verify the first privacy level included in the message corresponds to a privacy level associated with the second terminal,
after the second terminal is authenticated, obtain a first image based on the message, wherein the first image is processed according to the verified first privacy level,
transmit, via the transceiver, to the second terminal, the first image,
receive, via the transceiver, a level-up request message from the second terminal, the level-up request message including information related to a second privacy level allowing access to an image similar to a raw image before being processed rather than the first image processed based on the first privacy level, and
transmit, via the transceiver, to the second terminal, a second image processed based on the second privacy level among processed images, if the verification of the information related to the second privacy level is completed,
wherein, if an emergency situation notification message including an indicator indicating occurrence of an emergency situation is received, by the transceiver, from the second terminal, the processor is further configured to:
authenticate, by the processor, the second terminal,
verify, by the processor, whether the emergency situation has occurred based on the indicator,
transmit, to the sensor unit, a notification of the emergency situation including the indicator indicating occurrence of the emergency situation received from the second terminal,
receive, from the sensor unit, the raw image and information related to the emergency situation, and
transmit, via the transceiver, the raw image and the information related to the emergency situation to the second terminal, an emergency center and a nearby terminal, regardless of the first privacy level and the second privacy level.

12. The first terminal of claim 11, wherein:
a plurality of privacy levels includes a plurality of image permission levels, the plurality of image permission levels indicates whether access to the processed images is permitted,
when one of the plurality of image permission levels is high, the access to one of the processed images that is similar to the raw image is permitted.

13. The first terminal of claim 11, wherein the processor is configured to compare the first privacy level included in the message with another privacy level that is permitted to the second terminal by a policy.

14. The first terminal of claim 11, wherein the processor is further configured to control the transceiver to transmit, to the second terminal, an image that is processed based on a privacy level with a default value, when the message does not include the first privacy level.

15. The first terminal of claim 11, wherein the processor is further configured to previously set the first privacy level in a call setup and registration procedure through a session description protocol (SDP) parameter or a home subscriber server (HSS).

16. The first terminal of claim 11, wherein the processor is further configured to control the transceiver to transmit at least one of a patient identifier (ID) of a patient, a wearable device ID of the patient, and an e-health device ID of the patient.

* * * * *